ACETONIDES OF α-MONOGLYCERIDES
OF 4-(2'-CARBOXYPHENYLAMINO)-
CHLOROQUINOLINES

André Allais, Les Lilas, Pierre Girault, Paris, Robert Joly, Montmorency, Julien Warnant, Neuilly-sur-Seine, and Bernard Goffinet, Paris, France, assignors to Roussel-UCLAF, Paris, France, a corporation of France
No Drawing. Continuation of application Ser. No. 523,911, Feb. 1, 1966. This application May 15, 1969, Ser. No. 827,103
Claims priority, application France, Apr. 2, 1965, 11,769; July 2, 1965, 23,310; Aug. 13, 1965, 28,308
Int. Cl. C07d 33/52
U.S. Cl. 260—287     3 Claims

ABSTRACT OF THE DISCLOSURE

Acetonides of α-monoglycerides of 4-(2'-carboxyphenylamino)-chloro-quinolines of the formula

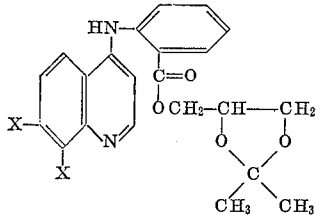

wherein one X is chlorine and the other X is hydrogen. The invention also relates to novel anti-inflammatory and analgesic compositions.

---

This application is a continuation of application Ser. No. 523,911, filed Feb. 1, 1966, now abandoned.

STATE OF THE ART

In copending, commonly assigned United States patent application filed on even date with the present application, there is described a process for the preparation of the α-monoglyceride of 4-(2'-carboxyphenylamino)-8-chloroquinoline which possesses analgesic and anti-inflammatory activity in which the acetonide of α-monoglyceride of 4-(2'-carboxyphenylamino)-8-chloro-quinoline is produced as an intermediate. It has now been found that the acetonide of Formula I possess anti-inflammatory activity and a remarkable analgesic activity.

OBJECTS OF THE INVENTION

It is an object of the invention to provide the novel acetonides of the α-monoglycerides of Formula I.

It is another object of the invention to provide novel anti-inflammatory and analgesic compositions.

It is a further object of the invention to provide a novel method of relieving pain and inflammation in mammals.

These and other objects and advantages of the invention will become obvious from the following detailed description.

THE INVENTION

The novel compounds of the invention are selected from the group consisting of the α-monoglycerides of 4-(2'-carboxyphenylamino)-chloro-quinoline of the formula

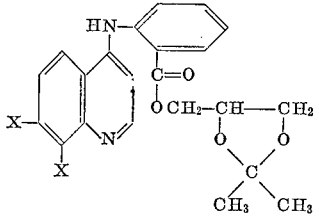

wherein one X is chlorine and the other X is hydrogen.

The acetonides of the α-monoglycerides of Formula I are conveniently prepared by reacting 4,7- or 4,8-dichloroquinoline with a lower alkyl anthranilate to form the corresponding 4-(2'-carbo lower alkoxy phenylamino)-7 or 8-chloro-quinoline and subjecting the latter to transesterification with glycerol acetonide in the presence of an alkaline agent such as sodium amide or sodium to form the corresponding acetonide of the α-monoglyceride of 4-(2'-carboxyphenylamino)-7 or 8-chloro-quinoline. The reaction scheme is illustrated in Table I.

TABLE I

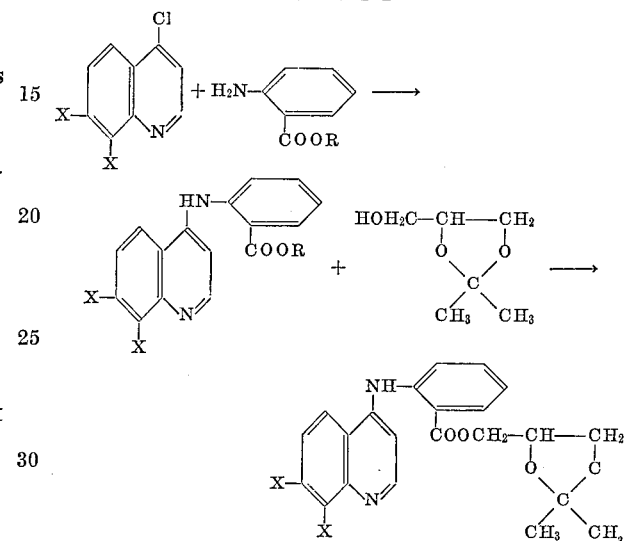

wherein R is lower alkyl of 1 to 7 carbon atoms and one X is chlorine and the other X is hydrogen.

The novel analgesic and anti-inflammatory compositions of the invention are comprised of at least one acetonide of the α-monoglycerides of 4-(2'-carboxyphenylamino)-chloro-quinolines of the formula

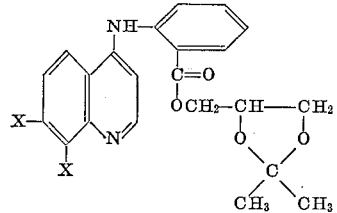

wherein one X is chlorine and the other X is hydrogen, and a major amount of a pharmaceutical carrier. The compositions can be used for the treatment of muscular pains, articular or neurotic pains, toothaches, rheumatic disturbances, zona, migraines and febrile and infectious conditions. The compositions may be in the form of injectible solutions or suspensions, in ampules, in multi-dose flacons, in the form of tablets, coated tablets and suppositories prepared in the usual manner and may be administered orally, rectally or transcutaneously.

The method of the invention for relieving pain and inflammations in mammals comprises administering to the mammals an effective amount of at least one acetonide of the α-monoglycerides of 4-(2'-carboxyphenylamino)-chloroquinolines of the formula

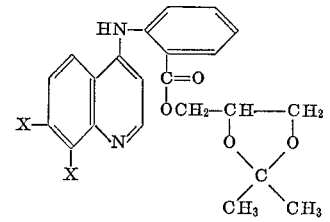

wherein one X is chlorine and the other X is hydrogen. The usual individual dose is 0.10 gm. to 0.40 gm. and 0.60 to 1.50 gm. per day in the adult weighing about 150 pounds depending upon the method of administration.

In the following examples there are described several preferred embodiments to illustrate the invention. However, it should be understood that the invention is to be limited only as defined in the appended claims.

Example I.—Preparation of the acetonide of the α-monoglyceride of 4-(2'-carboxyphenylamino)-8-chloro-quinoline Step A: Preparation of 4-(2'-carbomethoxyphenylamino)-8-chloro-quinoline.—15 gm. of 4,8-dichloro-quinoline, prepared according to D. S. Tarbell, J. Am. Chem. Soc., 68, 1277 (146), were introduced into 75 cc. of 2 N hydrochloric acid and after 11.5 gm. of methyl anthranilate were added thereto, the mixture was heated for 3 hours at reflux with agitation. Then, the reaction mixture was cooled in an ice-bath for 1 hour and vacuum filtered, and the residue was washed with water to obtain the hydrochloride of 4-(2'-carbomethoxy phenylamino)-8-chloroquinoline.

To obtain the free base, the said hydrochloride was dissolved in 200 cc. of ethanol and after 50 cc. of concentrated ammonia were added thereto. The solution was then cooled in an ice-bath. The precipitate formed was vacuum filtered, washed with ether and dried. After recrystallization from ethanol, 13 gm. of 4-(2'-carbomethoxyphenylamino)-8-chloro-quinoline, having a melting point of 183 to 184° C. were obtained Step B: Preparation of the acetonide of the α-monoglyceride of 4 - (2' - carboxy-phenylamina)-8-chloro-quinoline.—43 cc. of glycerol acetonide were added to 30 cc. of anhydrous toluene and the solution was heated to a temperature of 120 to 125° under an atmosphere of nitrogen. The water-toluene azetrope was distilled off, then the toluene was removed by distillation under vacuum. After cooling the solution to a temperature of 70° C., 130 gm. of sodium amide were introduced therein and the solution was heated for 1½ hours at about 90° C. Then, the temperature was lowered to 60° C. and 10.4 gm. of 4-(2'-carbomethoxyphenylamino)-8-chloro-quinoline were introduced into the solution, which was heated under vacuum for 5 hours at about 80° C. The resulting solution was cooled and poured into a water-methylene chloride mixture (10:1), and agitated and decanted. The aqueous phase was extracted with methylene chloride and the extract was washed with water, dried and distilled to dryness. The residue obtained was triturated with petroleum ether, filtered, vacuum filtered and dried to obtain 12.5 gm. of acetonide of the α-monoglyceride of 4-(2'-carboxyphenylamino)-8-chloro-quinoline, after which recrystallization from ethanol, had a melting point of 115° C.

The product obtained was insoluble in water and ether and soluble in acetone, benzene, chloroform and in hot ethanol and hot isopropyl ether.

*Analysis.*—Calculated for $C_{22}H_{21}O_4N_2Cl$ (percent); molecular weight=412.86: C, 63.99; H, 5.13; N, 6.78; Cl, 8.59. Found (percent): C, 64.1; H, 5.1; N, 7.1; Cl, 8.6.

This compound is not described in the literature.

Example II.—Preparation of the acetonide of the α-monoglyceride of 4-(2'-carboxyphenylamino)-7-chloro-quinoline 5 gm. of sodium amide were added to 1,000 cc. of anhydrous glycerol acetonide heated to 70 to 75° C. under agitation while a stream of nitrogen was allowed to bubble through the solution which was then heated for 1½ hours at about 90 to 95° C. The said solution was cooled to about 60° C. and then 500 gm. of 4-(2'-carbomethoxyphenylamino)-7-chloro-quinoline, prepared according to the process described in U.S. Patent No. 3,174,972, were slowly added to the solution with agitation. Then, the reaction mixture was progressively heated until a temperature of 80° C. was attained, and the heating was maintained at that temperature for 5 hours. Thereafter, the reaction mixture was cooled and poured into a mixture of methylene chloride and water (1:14) and the mixture was agitated for about 15 minutes after which time the organic phase was decanted. After the aqueous phase was re-extracted with methylene chloride the organic phases were combined, filtered, washed with water and distilled to dryness to obtain the acetonide of the α-monoglyceride of 4-(2'-carboxyphenylamino)-7-chloro-quinoline. The residue was triturated in petroleum ether, filtered, vacuum filtered and to obtain the said acetonide which had a melting point of 108° C. after recrystallization from ethanol. This compound is not described in the literature.

PHARMACOLOGICAL STUDY

Analgesic activity

The test employed was based on the fact noted by Koster et al. (Fed. Proc., 1959, 18, 412) according to which the intraperitoneal injection of acetic acid provoked repeated characteristic movements of stretching and twisting persisting in mice for more than six hours. Analgesics prevent or suppress this syndrome which is an exterior manifestation of a diffuse abdominal pain.

A solution of 6 parts per thousand of acetic acid in water containing 10% of arabic gum was employed and the dose releasing the syndrome in mice under these conditions was 0.01 cc./gm., being 60 mg./kg. of acetic acid. The analgesics were administered orally to groups of five mice, which had not beed fed for 24 hours, a half hour before the intraperitoneal injection of the acetic acid. The stretchings were observed, noted and counted for each mouse and then additionally by groups of five, during a period of observation of fifteen minutes immediately after the injection of acetic acid. The average number of stretchings observed on the control groups of five mice during the period of observation indicated, was established at 406 per group.

The acetonide of the α-monoglyceride of 4-(2'-carboxyphenylamino)-7-chloro-quinoline which was administered in the form of an aqueous suspension diminished the number of stretchings in a fashion obviously proportional to the doses utilized, as shown in Table II.

TABLE II

| | Doses administered, mg./kg. | Number of stretchings per groups of 5 mice | Percent of stretchings by reference to the average of the controls | Percent of protection |
|---|---|---|---|---|
| Controls | 0 | 406 | | |
| Acetonide of the α-monoglyceride of 4-(2'-carboxyphenylamino)-7-chloroquinoline | 10 | 319 | 78 | 22 |
| | 20 | 222 | 55 | 45 |
| | 50 | 136 | 33 | 67 |
| | 100 | 88 | 22 | 78 |
| | 200 | 68 | 16 | 84 |
| | 500 | 42 | 10 | 90 |

The data of Table II shows that the effective $ED_{50}$ dose for the acetonide of α-monoglyceride of 4-(2'-carboxyphenylamino)-7-chloro-quinoline is about 30 mg./kg. Using the same test procedure, the effective $ED_{50}$ dose for the acetomide of α-monoglyceride of 4-(2'-carboxyphenylamino)-8-chloro-quinoline was about 50 mg./kg. which the analgesic $ED_{50}$ dose for aspirin is 160 mg./kg. in the same test.

Anti-inflammatory activity

Test of the edematized paw in the rat.—The test consisted in administering to rats weighing from 160 to 170 gm. in a single injection 500γ of naphthoylheparamine in the aponeurotic pad of a posterior paw in order to provoke the formation of an inflammatory edema. The products to be studied were administered orally one hour before the injection. The maximum circumference of the two posterior paws was measured two hours and three hours after the injection and the difference between the circumferences of the two posterior paws of each animal (paw having received the injection of naphthoylheparamine and the intact paw) served to evaluate the extent of the inflammation. The measure of the inflammation in the treated rats was expressed in percentage with reference to those of the control animals. The results are summarized in Table III.

Table III shows that the 40% active dose ($AD_{40}$) is about 20 mg./kg. for the acetonide of α-monoglyceride of 4-(2'-carboxyphenylamino)-7-chloro-quinoline and about 50 mg./kg. for the acetonide of α-monoglyceride of 4-(2'-carboxyphenylamino)-8-chloro-quinoline.

Various modifications of the composition and method of the invention may be made without departing from the spirit or scope thereof and it is to be understood that the invention is to be limited only as defined in the appended claims.

We claim:

1. An acetonide of α-monoglyceride of 4-(2'-carboxyphenylamino)-chloro-quinoline of the formula

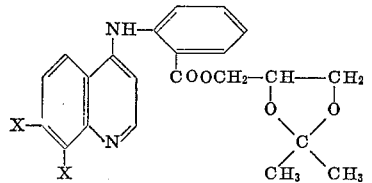

wherein one X is chlorine and the other X is hydrogen.

2. The compound of claim 1 wherein the X in the 7-position is chlorine.

3. The compound of claim 1 wherein the X in the 8-position is chlorine.

TABLE III

| Products | 10 mg./kg. | | 20 mg./kg. | | 50 mg./kg. | | 100 mg./kg. | |
|---|---|---|---|---|---|---|---|---|
| | 2 hrs. after | 3 hrs. after | 2 hrs. after | 3 hrs. after | 2 hrs. after | 3 hrs. after | 2 hrs. after | 3 hrs. after |
| Acetonide of α-monoglyceride of 4-(2'-carboxyphenylamino) 7-chloroquinoline | 23 | 0 | 65 | 43 | 72 | 57 | 70 | 50 |
| Acetonide of α-monoglyceride of 4-(2'-carboxyphenylamino) 8-chloroquinoline | 1 | 6 | 16 | 1 | 63 | 45 | | |

References Cited

UNITED STATES PATENTS 2,769,808 11/1956 Tenenbaum _____ 260—340.9 X
3,132,145 5/1964 Allais et al. _____ 260—286
3,151,026 9/1964 Allais et al. _____ 260—287 X
3,232,944 2/1966 Allais et al. _____ 260—286

DONALD G. DAUS, Primary Examiner

U.S. Cl. X.R.

260—283, 340.9, 471; 424—258